United States Patent
Diab et al.

(10) Patent No.: US 7,915,755 B2
(45) Date of Patent: Mar. 29, 2011

(54) SYSTEM AND METHOD FOR ENABLING POWER APPLICATIONS OVER A SINGLE COMMUNICATION WIRE PAIR

(75) Inventors: Wael William Diab, San Francisco, CA (US); Shimon Elkayam, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 172 days.

(21) Appl. No.: 12/371,663

(22) Filed: Feb. 16, 2009

(65) Prior Publication Data
US 2010/0019752 A1    Jan. 28, 2010

Related U.S. Application Data

(60) Provisional application No. 61/082,541, filed on Jul. 22, 2008.

(51) Int. Cl.
*H02J 3/00* (2006.01)

(52) U.S. Cl. .......................................................... 307/17
(58) Field of Classification Search ...................... 307/17
See application file for complete search history.

(56) References Cited

U.S. PATENT DOCUMENTS 7,299,368 B2 * 11/2007 Peker et al. .................. 713/300

* cited by examiner

*Primary Examiner* — Robert L. Deberadinis
(74) *Attorney, Agent, or Firm* — Duane S. Kobayashi

(57) ABSTRACT

A system and method for enabling power applications over a single communication wire pair. In one embodiment, a data transformer is provided that has three separate windings. Two of the windings are tied to each other via high frequency pass DC-blocking capacitors, or another suitable element that creates an AC path while providing a DC block, such that the voltage forms on either ends of the DC-blocking capacitors and the signal is sent on the outer legs of each winding. A circuit measures the current draw (I) and injects a current proportional to, but smaller than, I into a third bias cancellation winding.

21 Claims, 6 Drawing Sheets

SYSTEM AND METHOD FOR ENABLING POWER APPLICATIONS OVER A SINGLE COMMUNICATION WIRE PAIR

This application claims priority to provisional application No. 61/082,541, filed Jul. 22, 2008, which is incorporated by reference herein, in its entirety, for all purposes.

BACKGROUND

1. Field of the Invention

The present invention relates generally to power applications and, more particularly, to a system and method for enabling power applications over a single communication wire pair.

2. Introduction

Power over Ethernet (PoE) (also known as inline power and phantom power) specifications such as IEEE 802.3af (PoE) and 802.3at (PoE Plus) provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

Conventionally, the PoE and PoE Plus specifications are designed to work on two-pair cabling using a pair of transformers in the PSE and the PD. PoE is capable of running over a worst case of 100 m on two pairs of Cat 3 cabling and PoE Plus is capable of running on a worst case of 100 m on two pairs of Cat 5 cabling. Implementations of PoE and PoE Plus include multiple instantiations for example over all four pairs. Non-standard four-pair as well as two-pair implementations also exist.

Current specifications do not address certain applications such as those that exist in older buildings that contain one-pair wiring. What is needed therefore is a mechanism that enables the transmission of high-speed data and power over one-pair wiring using a single transformer near the PSE and the PD.

SUMMARY

A system and/or method for enabling power applications over a single communication wire pair, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
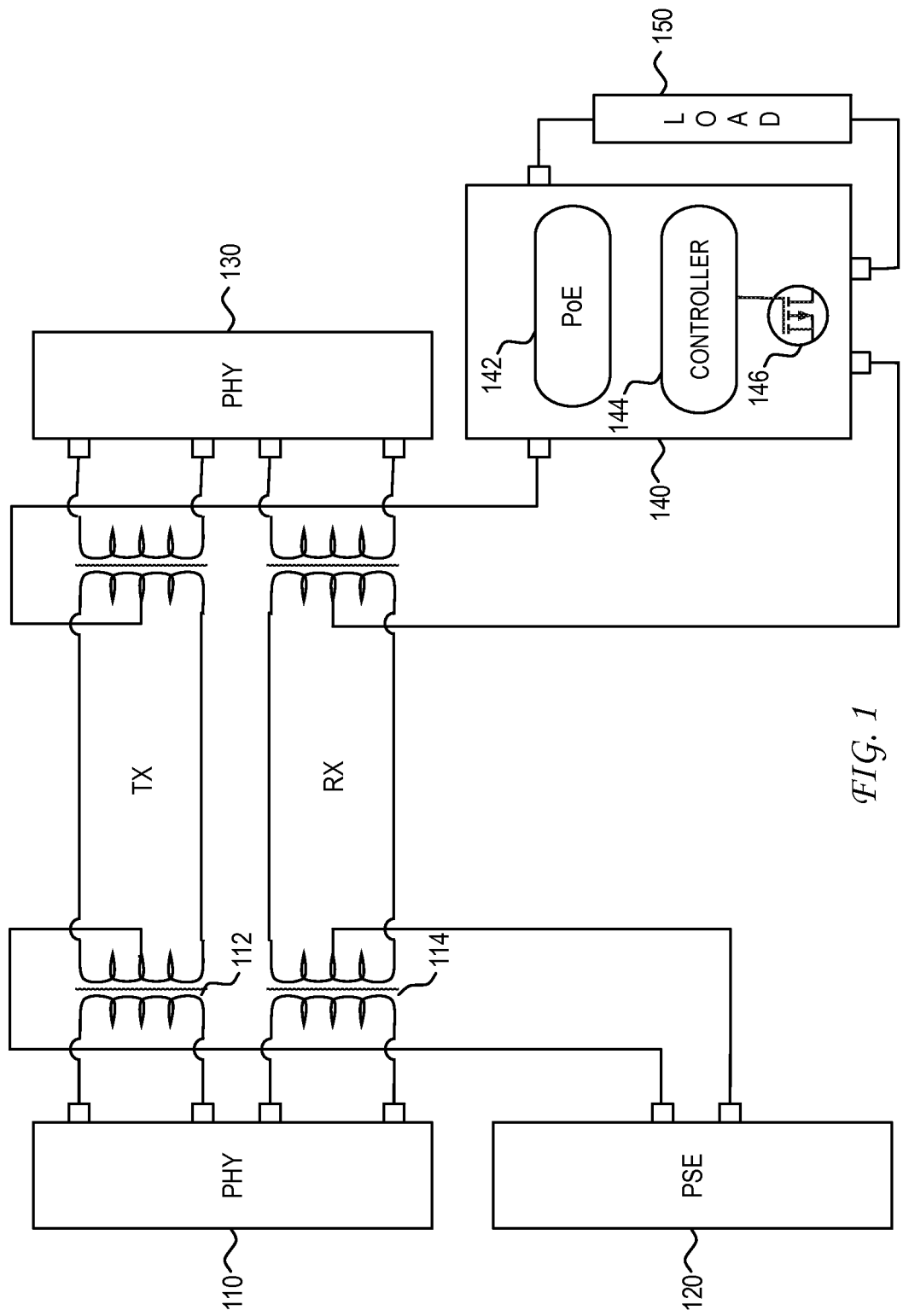
FIG. 1 illustrates an embodiment of a two-pair PoE system.

FIG. 1 illustrates an example of a conventional PoE system. As illustrated, the PoE system includes PSE 120 that transmits power to powered device (PD) 140 over two wire pairs. Power delivered by PSE 120 to PD 140 is provided through the application of a voltage across the center taps of a first transformer 112 that is coupled to a transmit (TX) wire pair and a second transformer 114 that is coupled to a receive (RX) wire pair carried within an Ethernet cable.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, or any other type of PoE transmission. PD 140 also includes controller 144 (e.g., pulse width modulation DC:DC controller) that controls power transistor (e.g., FET or bipolar) 146, which in turn provides constant power to load 150.

Figure 2:
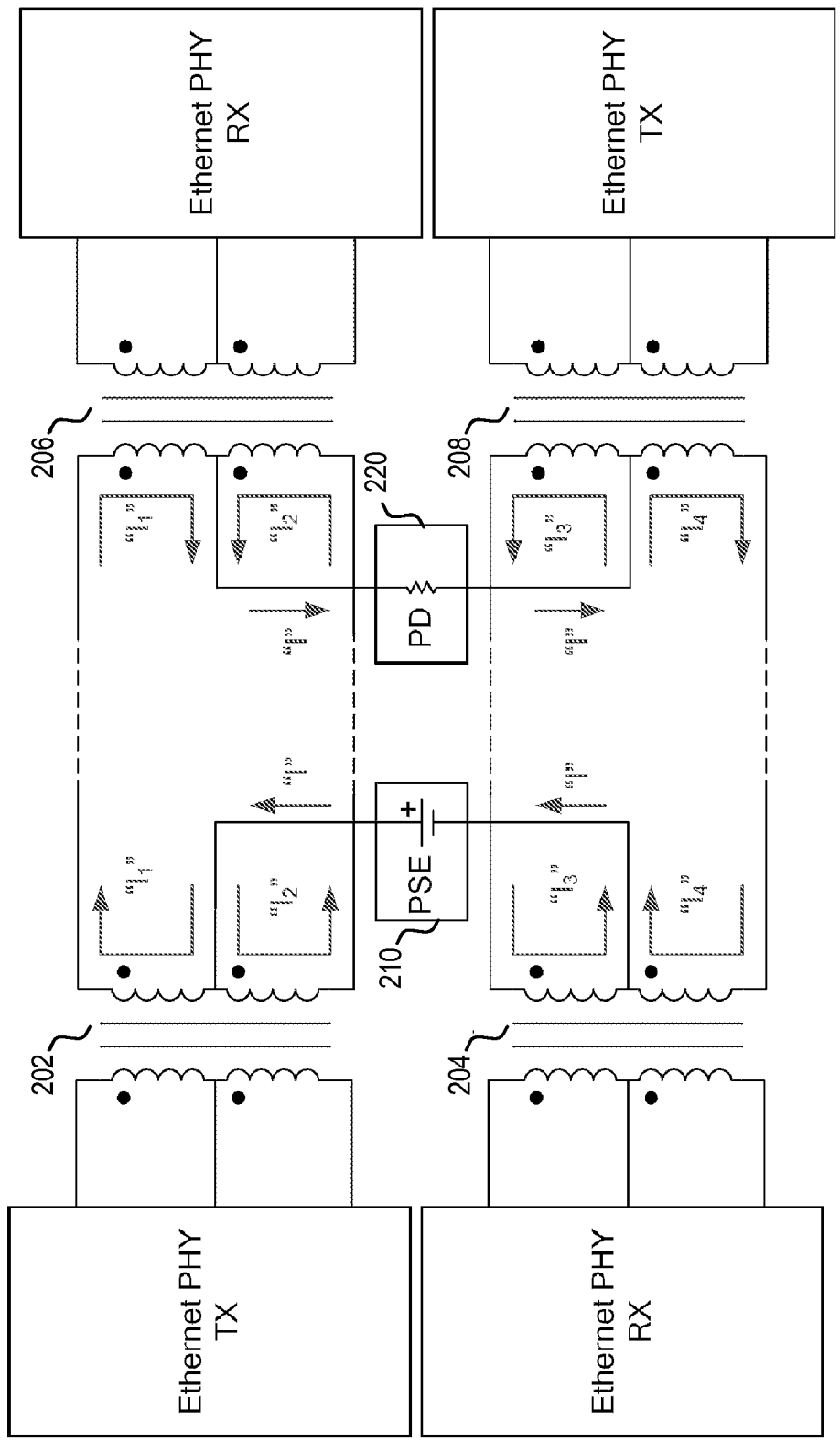
FIG. 2 illustrates an operation of a two-pair PoE system.

FIG. 2 illustrates an operation of a two-pair PoE system. As illustrated, power is injected by PSE DC power supply 210 at the center taps of data transformers 202 and 204 and extracted by PD 220 from the center taps of data transformers 206 and 208. In this illustration, the current "I" is the PoE current. This PoE current "I" gets split into $I_1$ and $I_2$ at the positive path and into $I_3$ and $I_4$ at the negative path such that $I=I_1+I_2=I_3+I_4$.

On each of the four data transformers 202, 204, 206, 208, the DC current does not cause core saturation since the currents flowing through the center taps are cancelling each other. In other words, currents $I_1$ and $I_2$ are flowing in and out of the winding points of transformers 202, 206, hence cancelling each other. The same is true for currents $I_3$ and $I_4$, where currents $I_3$ and $I_4$ are flowing in and out of the winding points of transformers 204, 208, hence cancelling each other. Here, it should be noted that if there is a current imbalance between the currents $I_1$ and $I_2$ or $I_3$ and $I_4$, then the core can be saturated if the imbalance current exceeds the core saturation current. In various example, this current imbalance can be produced through a difference in resistance between the two paths, mismatch in the transformer windings on each side, connectors, etc. Any mismatch can cause a difference in current to flow in one path versus the other. If the difference is small, then the transformer wouldn't saturate. If the difference is large, however, then the transformer will saturate. Saturation will impact the data behavior of the link as the transformer will no longer function properly. In general, the longer the cable the less the impact of the mismatch as it is a percentage of the overall resistance.

Conventional PoE specifications have been designed to work on two-pair cabling using a pair of transformers such as that illustrated in FIG. 2. As noted, however, a significant number of installations contain one-pair wiring. Accordingly, a new PoE mechanism that enables the transmission of data and power over one-pair wiring is needed to address these potential markets.

Figure 3:
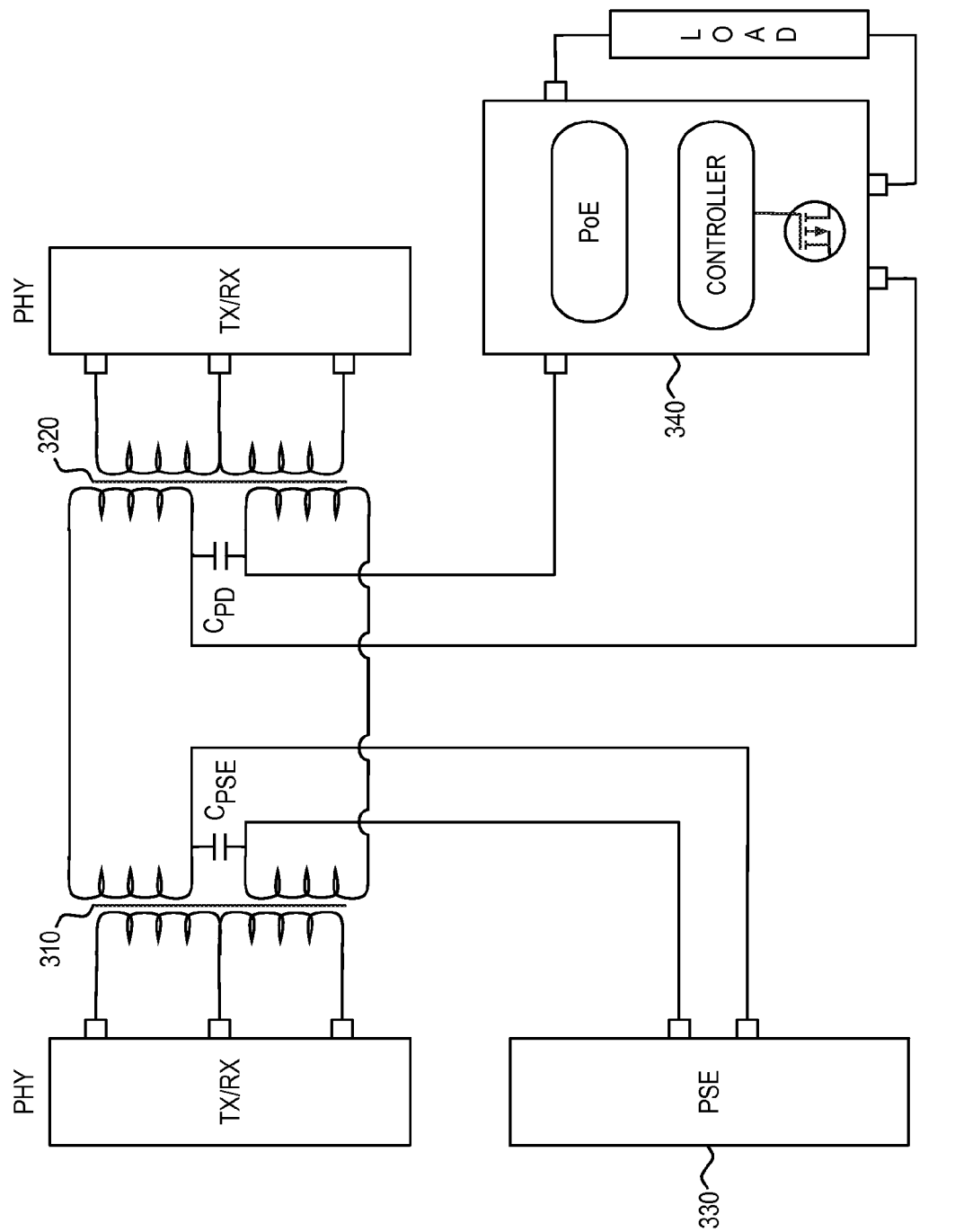
FIG. 3 illustrates an example of a single-pair PoE system.

For one-pair installations, only a single transformer is used at the PSE and the PD. FIG. 3 illustrates an example of such a system that uses single transformers at both the PSE and PD.

As illustrated, power can be injected by PSE DC supply 330 at the center tap of data transformer 310 and can be extracted by PD 340 from the center tap of data transformer 320. Both transformers 310 and 320 can have their secondary windings split into two separate windings. Capacitors $C_{PSE}$ and $C_{PD}$ can be placed in between those split secondary windings, thereby creating an AC path for the high-speed Ethernet communication signals. PSE DC power supply 320 can be connected in parallel to capacitor $C_{PSE}$ on the PSE side and PD 340 can be connected in parallel to capacitor $C_{PD}$ on the PD side. As would be appreciated, any suitable element that can create an AC path while providing a DC block can be used in place of the capacitors.

The problem with using a single transformer is that the transformer will saturate quickly. This results due to the absolute current that flows through the single transformer as opposed to the current that results from the differential mismatch when two transformers are used. The later problem can be addressed by using larger transformer cores. These larger transformer cores are expensive, however, and do not scale well with current. The larger transformer also gets hot and does not accommodate the typical space limitations presented by PSE/PD systems. More importantly, the larger transformer cores do not provide the required frequency response and other requirements needed for high speed data transmission.

Figure 4:
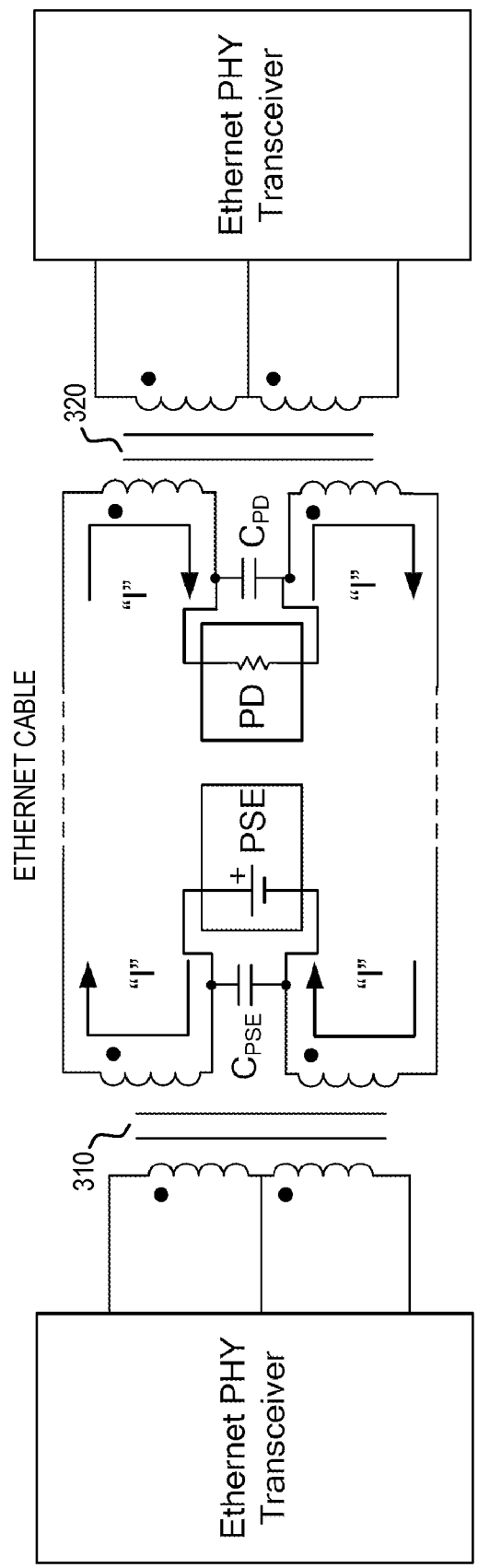
FIG. 4 illustrates an operation of a single-pair PoE system.

As illustrated in FIG. 4, the PoE DC current is injected and extracted at the internal taps of transformers 310, 320 secondary side, in parallel of the $C_{PSE}$ and $C_{PD}$ capacitors. Here, "I" is the PoE current at the Ethernet cable.

At each of the two data transformers 310 and 320, the DC current may cause core saturation if the transformers are not designed properly. This results since the currents flowing through the center taps are not cancelling each other. This means that the current "I" is flowing out of the winding points of the transformers, hence creating a DC bias at the transformer core. To address this scenario, the data transformers have to tolerate high DC bias current in order not to saturate. Unfortunately, this leads to large and expensive transformer designs, which may not be technically viable for the data transmission frequency of interest.

The present invention addresses the problems of conventional single transformer mechanisms in providing a solution that can facilitate the application of PoE to one-pair wiring applications. Reference is now made to the example embodiment of FIG. 5, which illustrates the principles of the present invention.

Figure 5:
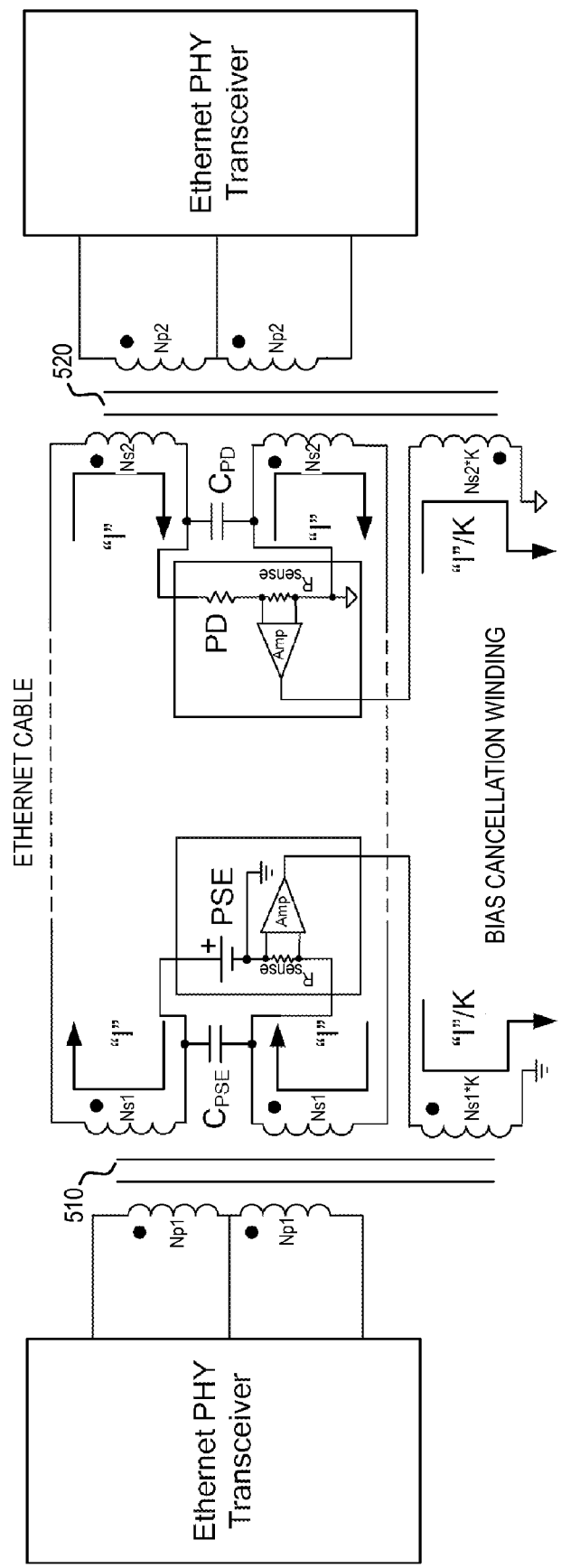
FIG. 5 illustrates an embodiment of a single-pair PoE system according to the present invention.

FIG. 5 illustrates an enhanced transformer structure of the present invention that eliminates the saturation issue created when PoE is used over a single wire pair. As illustrated, each of transformers 510 and 520 have three separate windings on their secondary side. Two of the windings are tied to each other via high frequency pass DC-blocking capacitors ($C_{PSE}$ and $C_{PD}$). The voltage forms on either ends of the DC-blocking capacitors ($C_{PSE}$ and $C_{PD}$) and the current is sent on the outer legs of each winding.

In accordance with the present invention, a current measurement circuit with feedback is used to measure the current draw "I". As illustrated, the PoE current "I" is sensed through a sense resistor $R_{sense}$ or any other current sensing mechanism on each of the sides of the Ethernet cable. A circuit on both the PSE and PD side, then generates a current proportional to, but smaller than, "I" in a magnitude of K. Here, K can be the ratio between the secondary data winding and the bias-cancellation winding. On the PSE side, that ratio is between the secondary data winding Ns1 and the bias-cancellation winding Ns1*K, while on the PD side, that ratio is between the secondary data winding Ns2 and the bias-cancellation winding Ns2*K. As would be appreciated, the ratio of windings and the value of K can be adjusted for a particular implementation.

As illustrated, the proportional current "I"/K is injected into the third winding on the secondary side of the transformers. This current "I"/K offsets the absolute current created in the setup with the first two windings and stops the transformer core from saturating. In other words, the current sensing and injecting circuitry plus the bias-cancellation winding eliminates the DC bias current at the data transformers.

Here, it should be noted that the total power the PD uses is $I*V_{PD}$. Accordingly, the windings can be increased through a balancing of the cost of the transformer against the power used for balancing.

As has been described, the principles of the present invention enable the creation of a small and inexpensive data transformer design that can be used in single-pair power applications such as PoE, PoE Plus, legacy powering systems, etc. More generally, the principles of the present invention can be used in xDSL, EoxDSL, Ethernet, extended reach Ethernet (e.g., BroadReach by Broadcom Corporation), non-Ethernet L2 communications, Energy Efficient Ethernet, audio-video bridging, Layer 2 for PoE and PoE Plus, automotive Ethernet, and other systems which implement power and/or high-speed communication over a single-pair data interface.

As would be appreciated, the single-pair interface can be provisioned along with other single-pair interfaces or multiple-pair interfaces. Control of such provisioning can be implemented using various Layer one or Layer two communication techniques.

Figure 6:
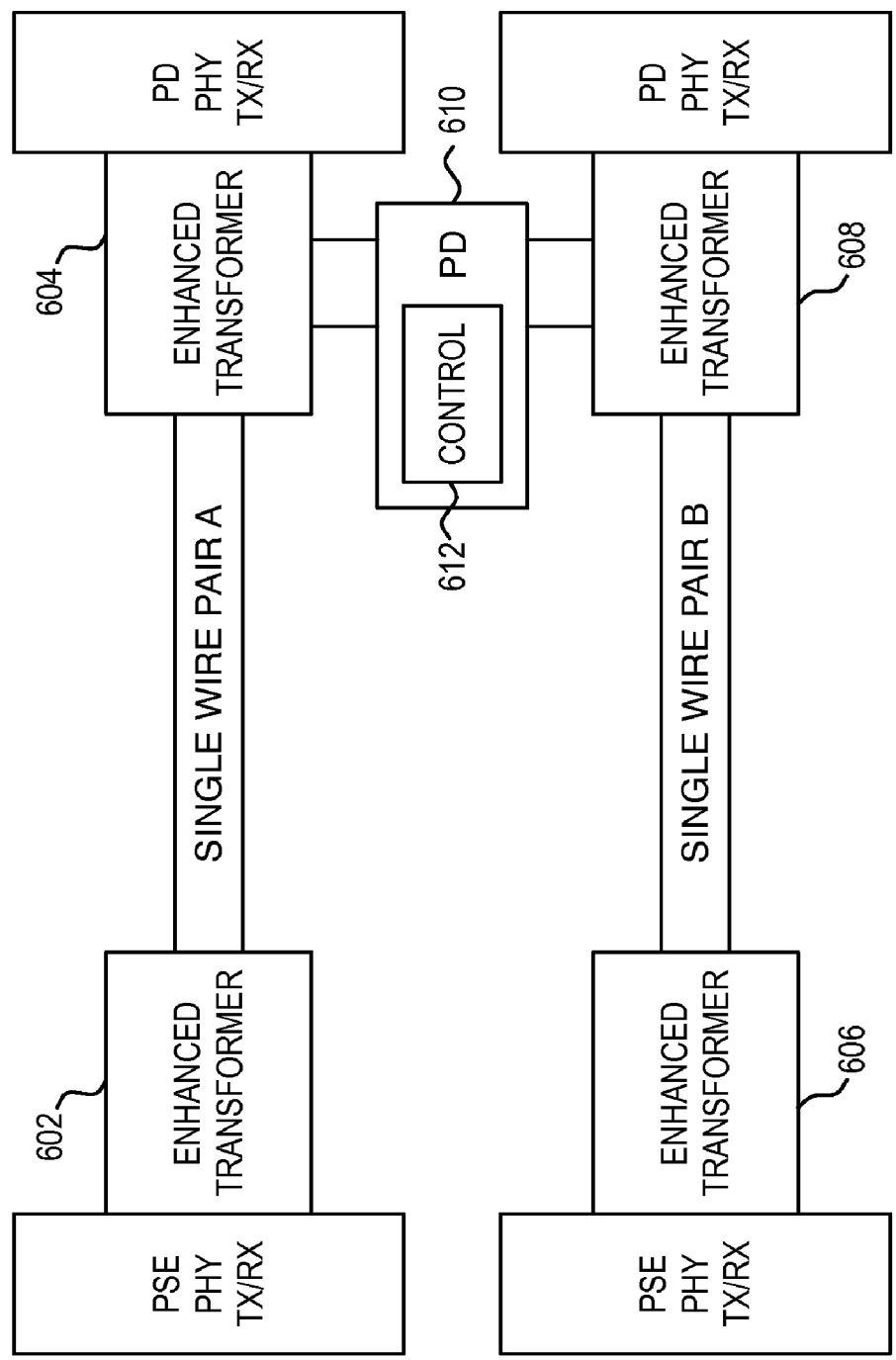
FIG. 6 illustrates an embodiment of a multi-pair PoE system according to the present invention.

In one example, multiple single-pair interfaces can be provisioned for a single device. FIG. 6 illustrates an embodiment of a mechanism for provisioning power to a single PD using multiple single-pair interfaces. As illustrated, two single wire pairs (A, B) can be used independently to provision power. Single wire pair A is used to connect enhanced transformer 602 on the PSE side with enhanced transformer 604 on the PD side, while single wire pair B is used to connect enhanced transformer 606 on the PSE side with enhanced transformer 608 on the PD side. In various provisioning scenarios, single wire pair A and single wire pair B can be designed to carry power from the same or different PSEs.

The power extracted from both single wire pair A and single wire pair B is provided to PD 610. As such, PD 610 is designed to receive power from two independent single wire pairs. A control module 612 in PD 610 can be used to enable power sharing between the two single-pair interfaces. In various embodiments, control module 612 can control the requests for power that are submitted to the PSE(s) as well as the distribution of power to different components within PD 610. In one embodiment, the multiple single-pair interfaces can be used in a redundancy scheme.

As would be appreciated, the principles of the present invention can be applied to single-pair applications without a data transformer, wherein the data transformer is emulated using integrated circuits.

In the above description, reference was made to the 802.3af and 802.3at specifications, which are amendments to the IEEE standard. As would be appreciated, the principles of the present invention would also be applicable to the underlying IEEE standard that incorporates such amendments as well as to future amendments to the IEEE standard.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A system that enables power delivery over a single wire pair data interface, comprising:
   a transformer having,
      a first winding;
      a second winding that is tied to said first winding via a DC blocking element;
      a third winding that is proportionally larger by a first factor than at least one of said first and second windings; and
   a circuit that measures a first current flowing through said first and second windings and injects a second current that is proportionally smaller by a second factor than said first current into said third winding.

2. The system of claim 1, wherein said first and second windings have a size that is substantially the same.

3. The system of claim 1, wherein said first factor and said second factor are substantially the same.

4. The system of claim 1, wherein said first current enables delivery of power levels defined by IEEE 802.3af.

5. The system of claim 1, wherein said first current enables delivery of power levels defined by IEEE 802.3at.

6. The system of claim 1, wherein said circuit includes a current sensing mechanism.

7. The system of claim 6, wherein said current sensing mechanism includes a sense resistor.

8. The system of claim 1, wherein said DC blocking element creates an AC path while providing a DC block.

9. The system of claim 8, wherein said DC blocking element is a capacitor.

10. A device that receives power over a plurality of wire pairs, comprising:
    a first transformer module that receives a first amount of power over a first single pair of wires;
    a second transformer module that receives a second amount of power over at least a second single pair of wires; and
    a powered device module that enables power sharing of power received from said first transformer module and said second transformer module.

11. The device of claim 10, wherein said second transformer module receives said second amount of power over a second single pair of wires.

12. The device of claim 10, wherein said second transformer module receives said second amount of power over two pairs of wires.

13. The device of claim 10, wherein said first amount of power conforms to IEEE 802.3af.

14. The device of claim 10, wherein said first amount of power conforms to IEEE 802.3at.

15. The device of claim 10, wherein said first transformer module includes a transformer having,
    a first winding;
    a second winding that is tied to said first winding via a capacitor;
    a third winding that is proportionally larger by a first factor than at least one of said first and second windings; and
    a circuit that measures a first current flowing through said first and second windings and injects a second current that is proportionally smaller by a second factor than said first current into said third winding.

16. The device of claim 10, wherein said first transformer module includes circuits that emulate the following:
    a first winding;
    a second winding that is tied to said first winding via a capacitor;
    a third winding that is proportionally larger by a first factor than at least one of said first and second windings; and
    a circuit that measures a first current flowing through said first and second windings and injects a second current that is proportionally smaller by a second factor than said first current into said third winding.

17. A data transformer device that enables power delivery over a single wire pair data interface, comprising:
    a first winding having a first end that is connected to a first wire of said single wire pair and a second end;
    a second winding having a first end that is tied to said second end of said first winding via an element that creates an AC path while providing a DC block and a second end that is connected to a second wire of said single wire pair, wherein said second end of said first winding and said first end of said second winding are also connected to a power sourcing equipment for delivery of a first current over said single wire pair; and
    a third winding that is proportionally larger by a first factor than at least one of said first and second windings, said third winding having a first end connected to said power sourcing equipment, wherein a second current received by said third winding from said power sourcing equipment is proportionally smaller by a second factor than said first current.

18. The device of claim 17, wherein said first and second windings have a size that is substantially the same.

19. The device of claim 17, wherein said first factor and said second factor are substantially the same.

20. The device of claim 17, wherein said first current enables delivery of power levels defined by IEEE 802.3af.

21. The device of claim 17, wherein said first current enables delivery of power levels defined by IEEE 802.3at.

* * * * *